US006181833B1

(12) United States Patent
Kuwabara

(10) Patent No.: US 6,181,833 B1
(45) Date of Patent: Jan. 30, 2001

(54) IMAGE PROCESSING APPARATUS WHEREIN THE IMAGE DATA IS REDUCED BEFORE THE IMAGE DATA IS STORED IN A MEMORY OR A BUFFER

(75) Inventor: Satoru Kuwabara, Ogaki (JP)

(73) Assignee: Brother Kogyo Kabushiki Kaisha, Nagoya (JP)

( * ) Notice: Under 35 U.S.C. 154(b), the term of this patent shall be extended for 0 days.

(21) Appl. No.: 09/071,804

(22) Filed: May 4, 1998

(30) Foreign Application Priority Data

May 8, 1997 (JP) .................................................. 9-117887

(51) Int. Cl.[7] ............................ G06K 9/32; H04N 1/393

(52) U.S. Cl. ........................................... 382/298; 358/451

(58) Field of Search .................................... 382/298, 299, 382/300; 358/501, 451, 452, 460, 296

(56) References Cited

U.S. PATENT DOCUMENTS 4,163,249 * 7/1979 Michael et al. .................... 358/21 R
4,240,113 * 12/1980 Michael et al. ...................... 358/180
4,899,227 * 2/1990 Yamada ............................... 358/452
5,047,857 * 9/1991 Duffield .............................. 358/183
5,105,284 * 4/1992 Sakata et al. ........................ 358/404
5,257,120 * 10/1993 Hirota ................................ 358/443
5,276,515 * 1/1994 Katsumata et al. .................. 358/160
5,398,117 * 3/1995 Suzuki et al. ........................ 358/451
5,535,007 * 7/1996 Kim .................................... 358/296
5,613,017 * 3/1997 Rao et al. ........................... 382/174
5,646,749 * 7/1997 Omi et al. ........................... 358/501
5,901,274 * 5/1999 Oh ...................................... 395/102

* cited by examiner

*Primary Examiner*—Bhavesh Mehta
*Assistant Examiner*—Kanji Patel
(74) *Attorney, Agent, or Firm*—Oliff & Berridge, PLC

(57) ABSTRACT

An image processing apparatus includes a memory for storing image data which includes plural groups of image data, each group of image data corresponding to a line of pixels arranged in a primary scanning direction which is perpendicular to a secondary scanning direction. The image processing apparatus further includes a writing reduction circuit for reducing the image in secondary scanning direction by deleting selected groups of image data before storing the set of image data in the memory, and a reading reduction-enlargement circuit for enlarging the image in said another scanning direction and for reducing or enlarging the image in said one scanning direction at the time of reading out the stored set of image data from the memory.

21 Claims, 5 Drawing Sheets

FIG.6

| COLOR | | ADDRESS START | ADDRESS END | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|---|
| GREEN | 48 | 76C00 | 77FFF | | | | | | | | | | | | | | | | | | | |
| | 47 | 75800 | 76BFF | | | | | | | | | | | | | | | | | | | |
| | 46 | 74400 | 757FF | | | | | | | | | | | | | | | | | | | |
| | • | • | • | | | | | | | | | | | | | | | | | | | |
| | • | • | • | | | | | | | | | | | | | | | | | | | |
| | • | • | • | | | | | | | | | | | | | | | | | | | |
| | 19 | 52800 | 53BFF | | | | | | | | | | | | | | | | | | | * |
| | 18 | 51400 | 527FF | | | | | | | | | | | | | | | | | | * | * |
| | 17 | 50000 | 513FF | | | | | | | | | | | | | | | | | * | * | * |
| | 16 | 4EC00 | 4FFFF | | | | | | | | | | | | | | | | * | * | * | * |
| | 15 | 4D800 | 4EBFF | | | | | | | | | | | | | | | * | * | * | * | * |
| | 14 | 4C400 | 4D7FF | | | | | | | | | | | | | | * | * | * | * | * | * |
| | 13 | 4B000 | 4C3FF | | | | | | | | | | | | | * | * | * | * | * | * | * |
| | 12 | 49C00 | 4AFFF | | | | | | | | | | | | * | * | * | * | * | * | * | * |
| | 11 | 48800 | 49BFF | | | | | | | | | | | * | * | * | * | * | * | * | * | * |
| | 10 | 47400 | 487FF | | | | | | | | | | * | * | * | * | * | * | * | * | * | * |
| | 9 | 46000 | 473FF | | | | | | | | | * | * | * | * | * | * | * | * | * | * | * |
| | 8 | 44C00 | 45FFF | | | | | | | | * | * | * | * | * | * | * | * | * | * | * | * |
| | 7 | 43800 | 44BFF | | | | | | | * | * | * | * | * | * | * | * | * | * | * | * | * |
| | 6 | 42400 | 437FF | | | | | | * | * | * | * | * | * | * | * | * | * | * | * | * | * |
| | 5 | 41000 | 423FF | | | | | * | * | * | * | * | * | * | * | * | * | * | * | * | * | * |
| | 4 | 3FC00 | 40FFF | | | | * | * | * | * | * | * | * | * | * | * | * | * | * | * | * | * |
| | 3 | 3E800 | 3FBFF | | | * | * | * | * | * | * | * | * | * | * | * | * | * | * | * | * | * |
| | 2 | 3D400 | 3E7FF | | * | * | * | * | * | * | * | * | * | * | * | * | * | * | * | * | * | * |
| | 1 | 3C000 | 3D3FF | * | * | * | * | * | * | * | * | * | * | * | * | * | * | * | * | * | * | * |
| BLUE | 32 | 3AC00 | 3BFFF | | | | | | | | | | | | | | | | | | | |
| | 31 | 39800 | 3ABFF | | | | | | | | | | | | | | | | | | | |
| | • | • | • | | | | | | | | | | | | | | | | | | | |
| | • | • | • | | | | | | | | | | | | | | | | | | | |
| | 11 | 20800 | 21BFF | | | | | | | | | | | | | | | | | | | * |
| | 10 | 1F400 | 207FF | | | | | | | | | | | | | | | | | | * | * |
| | 9 | 1E000 | 1F3FF | | | | | | | | | | | | | | | | | * | * | * |
| | 8 | 1CC00 | 1DFFF | | | | | | | | | | | | | | | | * | * | * | * |
| | 7 | 1B800 | 1CBFF | | | | | | | | | | | | | | | * | * | * | * | * |
| | 6 | 1A400 | 1B7FF | | | | | | | | | | | | | | * | * | * | * | * | * |
| | 5 | 19000 | 1A3FF | | | | | | | | | | | | | * | * | * | * | * | * | * |
| | 4 | 17C00 | 18FFF | | | | | | | | | | | | * | * | * | * | * | * | * | * |
| | 3 | 16800 | 17BFF | | | | | | | | | | | * | * | * | * | * | * | * | * | * |
| | 2 | 15400 | 167FF | | | | | | | | | | * | * | * | * | * | * | * | * | * | * |
| | 1 | 14000 | 153FF | | | | | | | | | * | * | * | * | * | * | * | * | * | * | * |
| RED | 16 | 12C00 | 13FFF | | | | | | | | | | | | | | | | | | | |
| | 15 | 11800 | 12BFF | | | | | | | | | | | | | | | | | | | |
| | • | • | • | | | | | | | | | | | | | | | | | | | |
| | • | • | • | | | | | | | | | | | | | | | | | | | |
| | 3 | 2800 | 3BFF | | | | | | | | | | | | | | | | | | | * |
| | 2 | 1400 | 27FF | | | | | | | | | | | | | | | | | | * | * |
| | 1 | 0 | 13FF | | | | | | | | | | | | | | | | | * | * | * |

GREEN START BLUE START RED START

FIG.7

GREEN

| | | |
|---|---|---|
| 3E800 | 3E801 | 3E802 |
| 3D400 | 3D401 | 3D402 |
| 3C000 | 3C001 | 3C002 |

BLUE

| | | |
|---|---|---|
| 16800 | 16801 | 16802 |
| 15400 | 15401 | 15402 |
| 14000 | 14001 | 14002 |

RED

| | | |
|---|---|---|
| 2800 | 2801 | 2802 |
| 1400 | 1401 | 1402 |
| 0 | 1 | 2 |

IMAGE PROCESSING APPARATUS WHEREIN THE IMAGE DATA IS REDUCED BEFORE THE IMAGE DATA IS STORED IN A MEMORY OR A BUFFER

BACKGROUND OF THE INVENTION

1. Field of the Invention

The present invention relates to an image processing apparatus which may be advantageously incorporated in a facsimile machine or any other machine which requires an image reducing and enlarging function.

2. Description of the Related Art

An image processing apparatus is used for various purposes. For example, it may be used for reducing and/or enlarging the images obtained by an image sensor. It may be also used for performing γ-control, color control, image sharpening and etc.

In a prior art image processing apparatus, image reduction and/or enlargement in the primary and secondary scanning directions is performed together at the time of storing the image data in a buffer memory or reading out the image data from the memory. Thus, the image processing apparatus requires a high-speed CPU for software processing or a large scale circuit for hardware processing, which results in a cost increase. This is particularly critical in the case of processing color images because different color sets of digitized image data (namely, a large amount of digitized image data) need to be processed.

Further, in the case of enlarging color images in both scanning direction at the time of writing the image data in the buffer memory, the capacity of the buffer memory must be large enough for storing a large amount of image data with a high efficiency and a high processing speed. The use of such a buffer memory will also lead to a cost increase.

SUMMARY OF THE INVENTION

It is, therefore, an object of the present invention is to provide an image processing apparatus which is capable of reducing and enlarging the image without entailing a cost increase problem.

Another object of the present invention is to provide an image processing apparatus which is capable of extracting the image data at high speed in sequence suitable for additional image processing.

According to a first aspect of the present invention, there is provided an apparatus for processing an image comprising: a memory for storing a set of image data which includes plural groups of image data, each group of image data corresponding to a line of pixels arranged in one scanning direction which is perpendicular to another scanning direction; a writing reducer for reducing the image in said another scanning direction by deleting selected groups of image data before storing the set of image data in the memory; and a reading reducer-enlarger for enlarging the image in said another scanning direction and for reducing or enlarging the image in said one scanning direction at the time of reading out the stored set of image data from the memory.

With the image processing apparatus described above, the writing reducer provides image reduction in said one scanning direction before data storage in the memory, whereas the reading reducer-enlarger provides image enlargement in said one scanning direction and image reduction or enlargement in said another direction at the time of reading out the stored set of image data from the memory. Thus, compared with the prior art wherein image reduction and/or enlargement in both scanning directions is performed together at the time of storing the image data in the memory or reading out the image data from the memory, the image processing apparatus does not require a high-speed CPU or a large scale circuit, thereby realizing a cost reduction. Further, the memory does not need to have a large capacity even when the image is enlarged in both scanning directions, because such image enlargement is performed only at the time of reading out the set of image data from the memory.

Typically, said one scanning direction may be a primary scanning direction in which the image pickup elements of an image sensor are arranged, whereas said another scanning direction may be a secondary scanning direction in which a document paper is moved relative to the image sensor. Further, the writing reducer may be provided by a writing reduction circuit, whereas the reading reducer-enlarger may be provided by a reading reduction-enlargement circuit.

Preferably, the writing reduction circuit may be supplied with line-start signals and clock signals of a predetermined frequency. Further, the writing reduction circuit may comprise a setting register for presetting a reduction ratio, a secondary scanning address generating circuit for generating a secondary scanning address which increases by a predetermined amount in synchronism with the clock signals upon input of a number of line-start signals determined according to the preset reduction ratio, and a primary scanning address generating circuit for generating a primary scanning address which increases one by one in synchronism with the clock signals.

Preferably, the secondary scanning address generated by the secondary scanning address generating circuit may start increasing from a first initial value and returns to the first initial value when a predetermined number of groups of image data are processed, whereas the primary scanning address generated by the primary scanning address generating circuit may start increasing from a second initial value and return to the second initial value when all image data in each group of image data are processed.

Preferably, the reading reduction-enlargement circuit may comprise a secondary direction enlargement circuit portion for enlarging the image in the secondary scanning direction by repetitively reading out each group of image data from the memory. For this purpose, the secondary direction enlargement circuit portion of the reading reduction-enlargement circuit may be supplied with line-start signals and clock signals of a predetermined frequency. Further, the secondary direction enlargement circuit portion may comprise a setting register for presetting an enlargement ratio, and a secondary scanning address generating circuit for generating a secondary scanning address which increases by a predetermined amount in synchronism with the clock signals upon input of a number of line-start signals determined according to the preset enlargement ratio.

On the other hand, the reading reduction-enlargement circuit may also comprise a primary direction reduction-enlargement circuit portion for reducing the image in the primary scanning direction by skipping selected pixel image data in each group of image data at the time of reading out the stored set of image data from the memory and for enlarging the image by repetitively reading out each pixel image data in each group of image data from the memory. More specifically, the primary direction reduction-enlargement circuit portion may comprise a setting register for presetting a reduction or enlargement ratio, and a primary scanning address generating circuit for generating a primary scanning address used for reading out the stored set of image data from the memory.

In operation, the primary scanning address generating circuit may be supplied with a flag. When the flag is in a first state (e.g., high level), the primary scanning address generating circuit enlarges the image in the primary scanning direction by repetitively reading out each pixel image data in each group of image data from the memory in accordance with the preset enlargement ratio. When the flag is a second state (e.g., low level), the primary scanning address generating circuit reduces the image in the primary scanning direction by skipping selected pixel image data in each group of image data in accordance with the preset reduction ratio at the time of reading out the stored set of image data from the memory.

In a preferred embodiment, the primary direction reduction-enlargement circuit portion of the reading reduction-enlargement circuit is supplied with clock signals of a predetermined frequency, and the primary direction reduction-enlargement circuit portion further comprises a frequency divider for dividing the frequency of the clock signals, whereby the primary scanning address generating circuit reads out the stored set of image data from the memory in synchronism with the divided clock signals.

According to a second aspect of the present invention, there is provided an apparatus for processing a color image comprising: a memory for storing different color sets of image data, each set of image data including plural groups of image data, each group of image data corresponding to a line of pixels arranged in one scanning direction which is perpendicular to another scanning direction; a writing reducer for reducing the color image in said another scanning direction by deleting selected groups of image data in each set of image data before storage in the memory; and a reading reducer-enlarger for enlarging the color image in said another scanning direction and for reducing or enlarging the color image in said one scanning direction at the time of reading out the stored sets of image data from the memory.

Typically, said one scanning direction may be a primary scanning direction, whereas said another scanning direction may be a secondary scanning direction. Further, the writing reducer may comprise a plurality of writing reduction circuits each for a different color set of image data, and the reading reducer-enlarger may comprise a single reading reduction-enlargement circuit common for the different color sets of image data.

Other objects, features and advantages of the present invention will be apparent from the detailed description of the preferred embodiment given below with reference to the accompanying drawings.

BRIEF DESCRIPTION OF THE DRAWINGS

In the accompanying drawings:

FIG. 6 is a table showing the content of color image data stored in a buffer memory; and FIG. 7 is a table showing the sequence in which the image data is read out from the buffer memory.

DETAILED DESCRIPTION OF THE PREFERRED EMBODIMENT

A preferred embodiment of the present invention will be described below with reference to the accompanying drawings.

Figure 1:
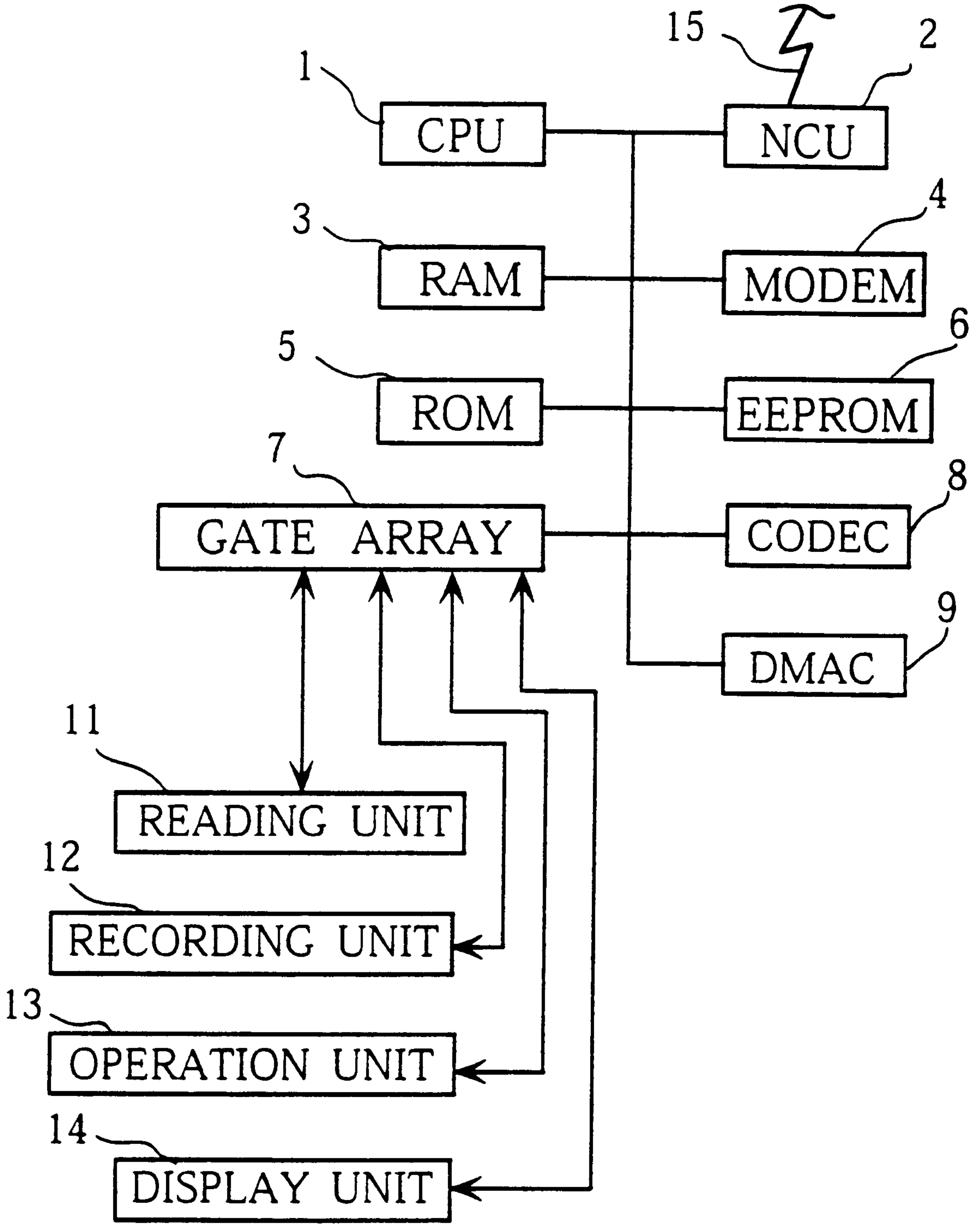
FIG. 1 is a circuit block diagram showing a facsimile machine which incorporates an image processing apparatus according to the present invention.

Reference is first made to FIG. 1 which is a circuit block diagram of a facsimile machine which incorporates an image processing apparatus embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading unit 11, a recording unit 12, an operation unit 13, and a display unit 14.

The CPU 1, the NCU 2, the RAM 3, the modem 4, the ROM 5, the EEPROM 6, the gate array 7, the codec 8 and the DMAC 9 are connected to each other via bus lines (digital lines). The bus lines include data bus lines, address bus lines and control signal bus lines. The gate array 7 is connected to the reading unit 11, the recording unit 12, the operation unit 13 and the display unit 14, respectively.

The CPU 1 provides an overall control of the facsimile machine as a whole.

The NCU 2 is connected to a telephone line 15 for providing network control. The NCU 2 is also connected to the modem 4 through an analog line.

The RAM 3 stores various digital data such as image data. Of course, an additional RAM or RAMs may be provided to increase the capacity of data storage.

The modem 4 modulates the transmitting codes and demodulates the received codes.

The ROM 5 stores various programs or the like as required for controlling the facsimile machine, whereas the EEPROM 6 stores registered data (e.g. shortcut dials) and/or flags.

The gate array 7 functions as an I/O interface (input/output interface) for the CPU 1 for data transmission to and/or from the reading unit 11, the recording unit 12, the operation unit 13 and the display unit 14. Further, in the illustrated embodiment, the gate array 7 works as an image processing apparatus for enlarging, reducing and/or sharpening the images received from the image reading unit 11, as more specifically described hereinafter.

The codec 8 performs coding of the transmitting image data and decoding of the received image data.

The DMAC 9 provides memory access control with respect to the RAM 3 and EEPROM 6 for example.

The reading unit 11 reads out the image data from a document paper (not shown) for output through the gate array 7. More specifically, the reading unit includes a light source (not shown) for irradiating a document paper (not shown) with light, an image sensor (not shown) such as a color CCD (charge-coupled device) sensor for receiving the light reflected on the document paper to generate image detection signals, and a plurality of rollers (not shown) driven by a motor for transferring the document paper.

The recording unit 12 performs printing of images on a recording paper sheet (not shown) on the basis of the image data received from the reading unit 11 through the gate array 7. For this purpose, the recording unit 12 includes a motor (not shown) and rollers (not shown) connected to the motor for transferring a recording paper (not shown) in addition to a printhead (not shown) such as an ink jet printhead or a thermal printhead for printing out the received image data onto the recording paper.

The operation unit 13 has key switches (not shown) to be operated by the user for output of operation signals, whereas the display unit 14 includes an LCD (not shown) or the like for providing various indications under the control of the CPU 1.

Figure 2:
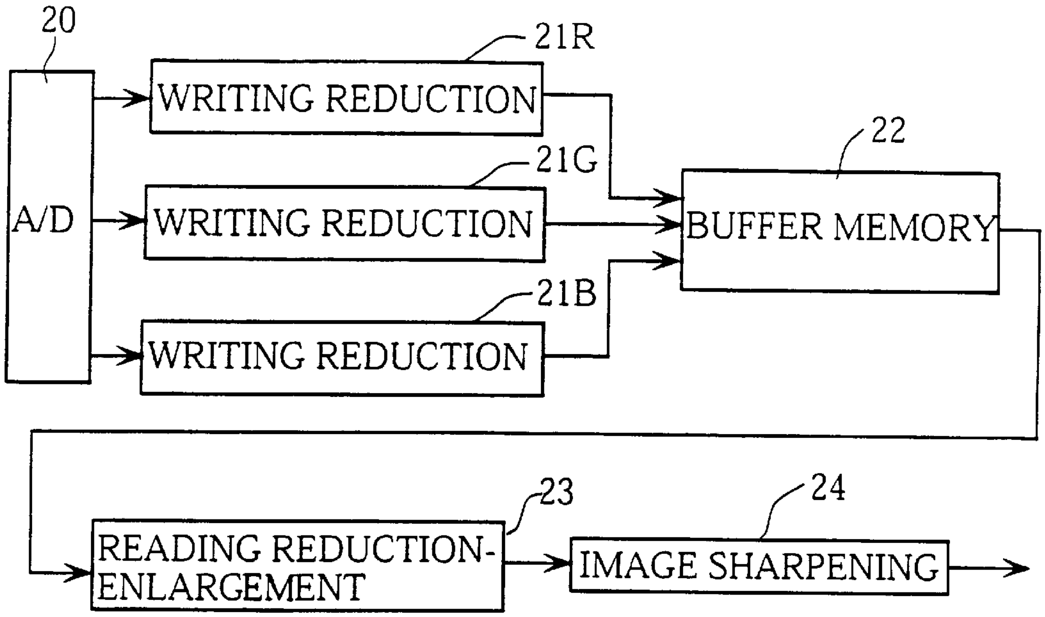
FIG. 2 is a circuit block diagram showing the general circuit arrangement for the image processing apparatus.

According to the illustrated embodiment, the gate array 7 incorporates an image processing unit. As shown in FIG. 2, the image processing unit (gate array 7) includes an analog-to-digital converter 20, a plurality of writing reduction circuits 21R, 21G, 21B, a buffer memory 22, a reading reduction-enlargement circuit 23, and an image sharpening circuit 24.

The analog-to-digital converter 20 converts the analog color image data from the image reading unit 11 to digital image data which include a red set of image data, a green set of image data and a blue set of image data, respectively. The A/D converter 20 has a switching function for separately generating different color sets of image data. Alternatively, the common A/D converter 20 may be replaced by separate A/D converters each for a corresponding color set of image data.

Though not shown in FIG. 2, the gate array 7 may additionally include a shading control circuit (not shown) and a γ-control circuit (not shown) behind the A/D converter 20 for performing shading control and γ-control for each color set of digitized image data.

The writing reduction circuit 21R reduces the red image data in the secondary scanning direction (i.e., paper feed direction) according to a preset reduction ratio and writes the reduced red image data in the buffer memory 22. Similarly, the writing reduction circuit 21G reduces the green image data in the secondary scanning direction according to the preset reduction ratio and writes the reduced green image data in the buffer memory 22. Further, the writing reduction circuit 21B reduces the blue image data in the secondary scanning direction according to the preset reduction ratio and writes the reduced blue image data in the buffer memory 22.

The buffer memory 22 comprises a DRAM (dynamic random access memory) having a high speed page mode for temporarily storing the different color sets of image data from the respective writing reduction circuits 21R, 21G, 21B.

The reading reduction-enlargement circuit 23 reads out the color image data from the buffer memory 22 in sequence suitable for subsequent image sharpening while enlarging the image data in the secondary scanning direction according to a preset enlargement ratio and reducing or enlarging the image data in the primary scanning direction according to a present reduction or enlargement ratio.

The image sharpening circuit 24 distinguishes binary image regions from natural image regions on the basis of the color image data from the reading reduction-enlargement circuit 23 for sharpening, through filtering, the contour of the image which lies in each binary image region. The image data output from the image sharpening circuit 24 may be transmitted to a subsequent color control circuit for additional image processing.

Figure 3:
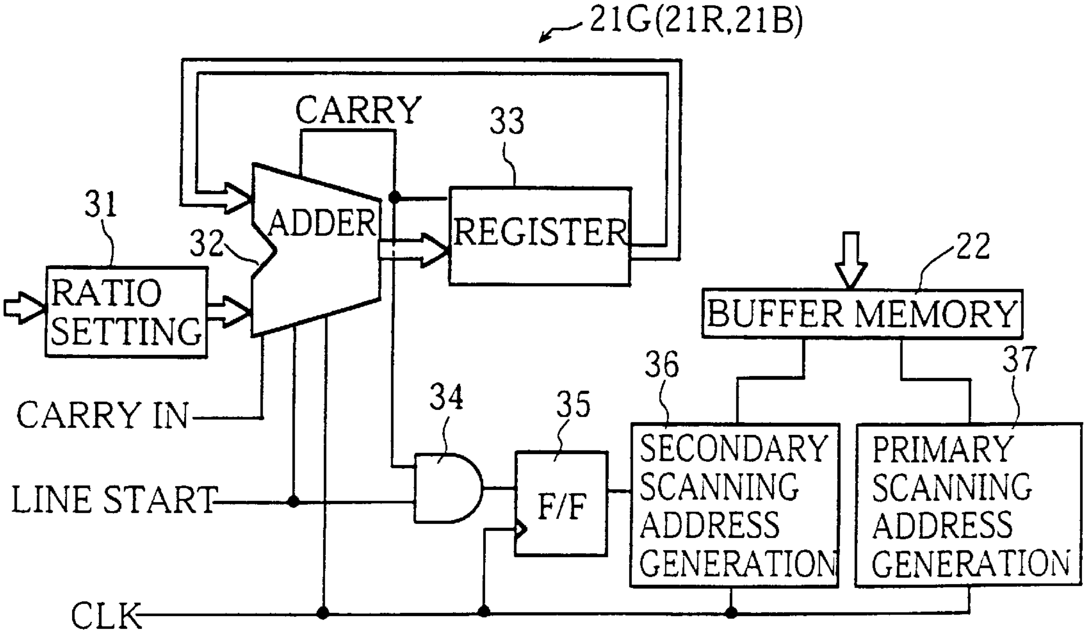
FIG. 3 is a circuit block diagram showing a secondary direction reduction circuit incorporated in the image processing apparatus.

As shown in FIG. 3, the writing reduction circuit 21G includes a setting register 31. an adder 32, a cumulative register 33, an AND circuit 34, a flip-flop circuit 35, a secondary scanning address generating circuit 36, and a primary scanning address generating circuit 37.

The setting register 31 retains a secondary direction reduction ratio which may be selected by the user through the operation unit 13 for setting under the control of the CPU 1.

The adder 32 adds the data (reduction ratio) retained in the setting register 31 and the data currently retained in the cumulative register 33 for output of the resulting sum to the cumulative register 33 for data renewal. Further, when a carry occurs, the adder 32 outputs a high-level carry signal to the AND circuit 34 and the cumulative register 33. The adder 32 is supplied with carry-in signals, line-start signals and clock signals of a predetermined frequency. The carry-in signals and the line-start signals are supplied from a respective register (not shown) which may be suitably set under the control of the CPU 1.

The cumulative register 33 temporarily retains the output data from the adder 32 but is cleared or reset upon reception of a high-level carry signal from the adder 32.

The AND circuit 34 generates a high-level signal for output to the flip-flop circuit 35 when both the carry signal from the adder 32 and the line-start signal are high. Conversely, the AND circuit 34 generates a low-level signal when either one of the carry signal and the line-start signal is low.

The flip-flop circuit 35 retains the output signal from the AND circuit 34 and outputs it to the secondary scanning address generating circuit 36 in synchronism with the clock signals.

The secondary scanning address generating circuit 36 increases the secondary scanning address by a predetermined amount for output to the buffer memory 22 (i.e., for renewal of the secondary scanning address data in the buffer memory 22) in synchronism with the clock signals when the output signal from the flip-flop circuit 35 is high. Conversely, when the output signal from the flip-flop circuit 35 is low, the secondary scanning address generating circuit 36 retains the secondary scanning address data currently held in the buffer memory 22. In the course of image processing, the secondary scanning address generated by the secondary scanning address generating circuit 36 starts increasing from a predetermined initial value and returns to this initial value when a predetermined number of lines of image data (corresponding to one whole page of image data) is processed.

The primary scanning address generating circuit 37 increases the primary address one by one for output to the buffer memory 22 in synchronism with the clock signals. The primary scanning address generated by the primary scanning address generating circuit 37 starts increasing from zero (0) and returns to zero when each line of green image data is processed.

The other writing reduction circuits 21R, 21B are identical in circuit arrangement to the writing reduction circuit 21G described above and shown in FIG. 3. However, due to the structure of the color image sensor (not shown), the blue set of image data is sent out from the image sensor with an 8-line delay relative to the green set of image data, whereas the red set of image data is sent out with an 8-line delay relative to the blue set of image data. Thus, the first eight (8) lines of blue image data as well as the first sixteen (16) lines of red image data are treated as ineffective data which are not written in the buffer memory 22.

Figure 4:
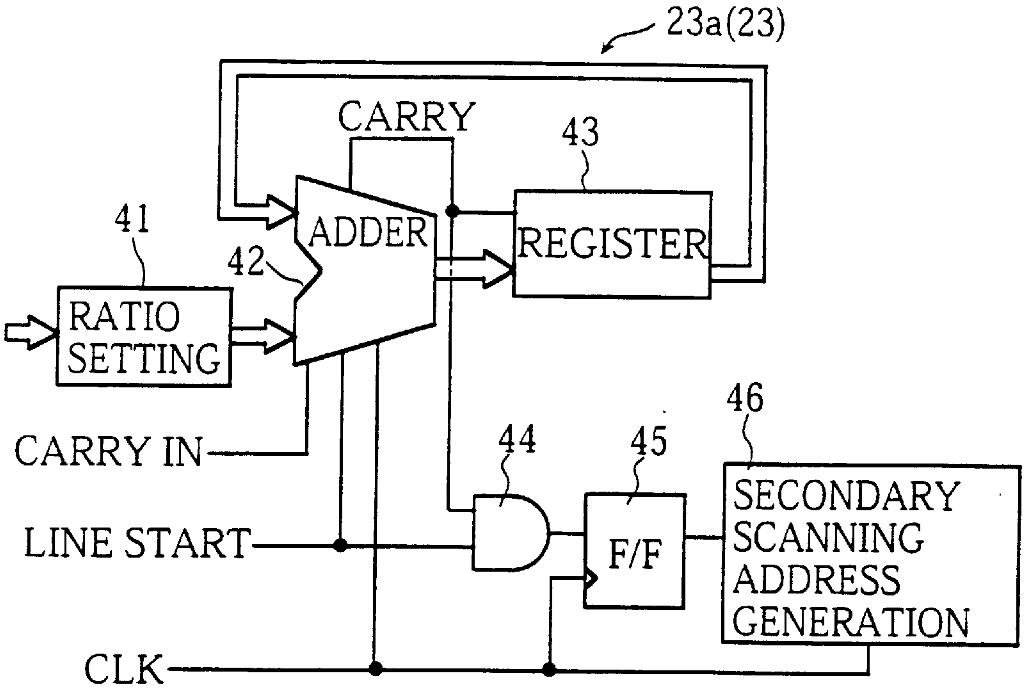
FIG. 4 is a circuit block diagram showing a secondary direction enlargement circuit portion of a secondary direction enlargement/primary direction reduction-enlargement circuit incorporated in the image processing apparatus.

As shown in FIG. 4, the reading reduction-enlargement circuit 23 has a secondary direction enlargement circuit portion 23*a* which includes a setting register 41. an adder 42, a cumulative register 43, an AND circuit 44, a flip-flop circuit 45, and a secondary scanning address generating circuit 46.

The setting register 41 retains a secondary direction reduction ratio which is set or registered under the control of the CPU 1.

The adder 42 adds the data (reduction ratio) retained in the setting register 41 and the data currently retained in the cumulative register 43 for output of the resulting sum to the cumulative register 43 for data renewal. Further, when a carry occurs, the adder 42 outputs a high-level carry signal to the AND circuit 44 and the cumulative register 43. The adder 42 is supplied with carry-in signals, line-start signals and clock signals of a predetermined frequency. The carry-in signals and the line-start signals are supplied from a respective register (not shown) which may be suitably set under the control of the CPU 1.

The cumulative register 43 temporarily retains the output data from the adder 42 but is cleared or reset upon reception of a high-level carry signal from the adder 42. The AND circuit 44 generates a high-level signal for output to the flip-flop circuit 45 when both the carry signal from the adder 42 and the line-start signal are high. Conversely, the AND circuit 44 generates a low-level signal when either one of the carry signal and the line-start signal is low.

The flip-flop circuit 45 retains the output signal from the AND circuit 44 and outputs it to the secondary scanning address generating circuit 46 in synchronism with the clock signals.

The secondary scanning address generating circuit 46 comprises three groups of shift registers, each group including three shift registers in three stages. The respective groups of shift registers correspond to different color sets (red, green and blue sets) of image data.

The secondary scanning address generating circuit 46 increases the secondary scanning address (which is the content of each group of shift registers) by a predetermined amount for output to the buffer memory 22 in synchronism with the clock signals when the output signal from the flip-flop circuit 45 is high. Conversely, when the output signal from the flip-flop circuit 45 is low, the secondary scanning address generating circuit 46 retains the secondary scanning address data currently held in each group of shift registers (i.e., the buffer memory 22). The secondary scanning addresses generated by the respective groups of shift registers start increasing from respective initial values which are different from each other, and return to the respective initial values when a predetermined number of lines of image data (corresponding to one whole page of image data) is processed. The secondary scanning addresses are output consecutively three times from the last stage shift register of each shift register group, this being the same with respect to the other two shift register groups.

Figure 5:
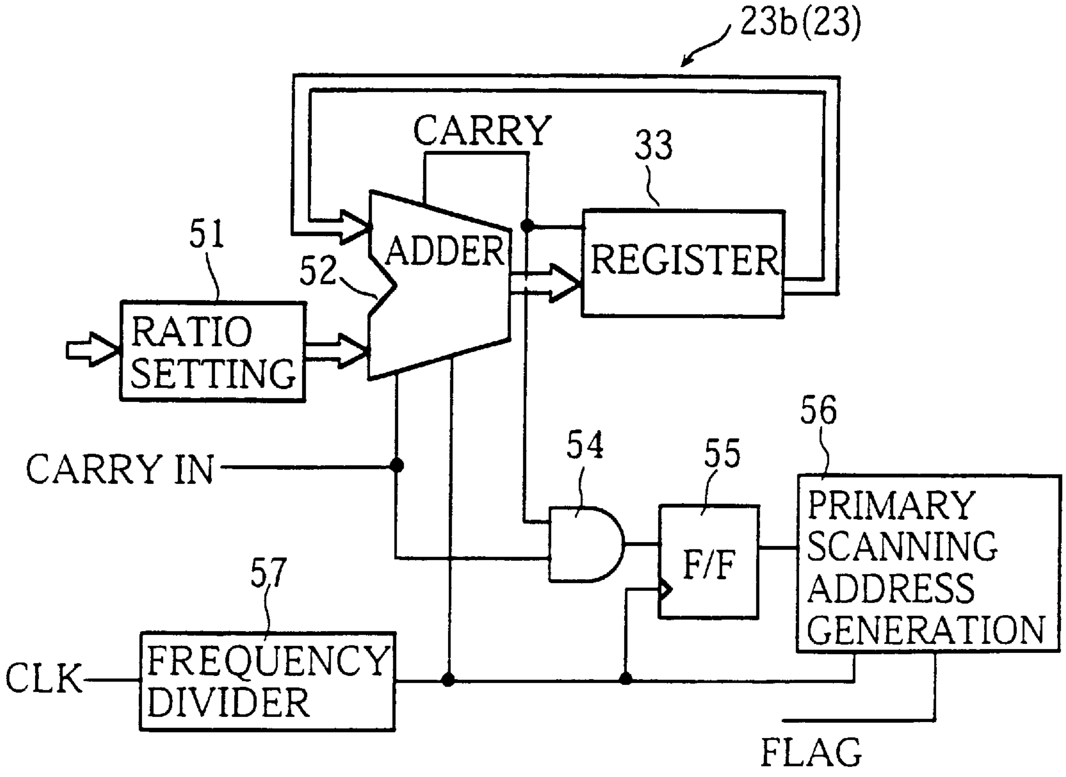
FIG. 5 is a circuit block diagram showing a primary direction reduction-enlargement circuit portion of the secondary direction enlargement/primary direction reduction-enlargement circuit.

As shown in FIG. 5, the reading reduction-enlargement circuit 23 also has a primary direction reduction-enlargement circuit portion 23*b* which includes a setting register 51. an adder 52, a cumulative register 53, an AND circuit 54, a flip-flop circuit 55, a primary scanning address generating circuit 56, and a frequency divider 57.

The setting register 51 retains a primary direction reduction or enlargement ratio which is set or registered under the control of the CPU 1.

The adder 52 adds the data (reduction or enlargement ratio) retained in the setting register 51 and the data currently retained in the cumulative register 53 for output of the resulting sum to the cumulative register 53 for data renewal. Further, upon occurrence of a carry, the adder 52 outputs a high-level carry signal to the AND circuit 54 and the cumulative register 53. The adder 52 is supplied with carry-in signals from a register (not shown) which may be suitably set under the control of the CPU 1. The adder 52 is also supplied with clock signals which are divided by the frequency divider 57.

The cumulative register 53 temporarily retains the output data from the adder 52 but is cleared or reset upon reception of a high-level carry signal from the adder 52.

The AND circuit 54 generates a high-level signal for output to the flip-flop circuit 55 when both the carry signal from the adder 52 and the carry-in signal are high. Conversely, the AND circuit 54 generates a low-level signal when either one of the carry signal and the carry-in signal is low.

The flip-flop circuit 55 retains the output signal from the AND circuit 54 and outputs it to the primary scanning address generating circuit 56 in synchronism with the divided clock signals.

The primary scanning address generating circuit 56 operates according to the output signal from the flip-flop circuit 56 and a flag from a register (not shown) which is set under the control of the CPU 1. More specifically, when the flag is 1 (i.e., high), the primary scanning address generating circuit 56 increases the primary scanning address one by one for output to the buffer memory 22 in synchronism with the divided clock signals if the output signal from the flip-flop circuit 55 is high. Conversely, if the output signal from the flip-flop circuit 55 is low, the primary scanning address generating circuit 56 retains the present primary scanning address data for output to the buffer memory 22. In the course of image processing, the primary scanning address generated by the primary scanning address generating circuit 56 starts increasing from an initial value of zero (0) and returns to zero when each line of image data are processed.

On the other hand, when the flag is z0(i.e., low), the primary scanning address generating circuit 56 increases the primary scanning address one by one in synchronism with the divided clock signals for output to the buffer memory 22 if the output signal from the flip-flop circuit 55 is high. Conversely, if the output signal from the flip-flop circuit 55 is low, the primary scanning address generating circuit 56 increases the primary scanning address data one by one but does not output the increased primary scanning address data to the buffer memory 22.

The frequency divider 57 may comprise a counter for example for dividing the clock signals of a predetermined frequency by a factor of nine (9). In this case, if the reduction or enlargement ratio is unity (1), the primary scanning address generated by the primary scanning address generating circuit 56 changes once as the secondary scanning address generated by the secondary scanning address generating circuit 46 changes nine times.

In summary, each of the writing reduction circuits 21R, 21G, 21B reduces the color image in the secondary scanning direction by selectively deleting lines (primary scanning lines) of image data according to the preset reduction ratio before storing in the buffer memory 22. The secondary direction enlargement circuit portion 23*a* of the reading reduction-enlargement circuit 23 enlarges the color image in the secondary scanning direction by repetitively reading out the same line (primary scanning line) of image data from the buffer memory 22 according to the preset enlargement ratio. The primary direction enlargement circuit portion 23*b* of the reading reduction-enlargement circuit 23 reduces or enlarges the color image in the primary scanning direction by skipping selected pixel data (picture element data) in each line (primary scanning line) of image data or repetitively duplicating each pixel data in each line of image data according to the preset reduction or enlargement ratio at the time of reading out the image data from the buffer memory 22

The facsimile machine described above operates in the following manner.

In the copy mode or facsimile transmission mode, the color image signals (including a red set of image signals, a green set of image signals and a blue set of image signals) from the color CCD image sensor (not shown) of the reading unit 11 (FIG. 1) are converted to 8-bit image data. The digitized image data thus obtained may be subjected to shading control and/or γ-control before being transmitted to each of the writing reduction circuits 21R, 21G, 21B.

Each of the writing reduction circuits 21R, 21G, 21B reduces the digitized image data in the secondary scanning direction by selectively deleting lines of image data according to the preset reduction ratio, and generates writing addresses for output to the buffer memory 22. The reduction ratio may be selected by the user through operating the keys of the operation unit 13 (FIG. 1), whereby the selected reduction ratio is set in the setting register 31 (FIG. 3) under the control of the CPU 1.

More specifically, the primary scanning address of the primary scanning address generating circuit 37 for the secondary direction reduction circuit 21G is initially set zero (0) but increases one by one in synchronism with the clock signals while each line of image data is processed. The adder 32 cumulatively adds the set value of the setting register 31 (corresponding to the reduction ratio selected by the user) to the feedback value from the cumulative register 33 at the rise of every line-start signal. Upon occurrence of a carry, the adder 32 generates a high-level carry signal for output to one input terminal of the AND circuit 34. At this time, since the line-start signal supplied to the other input terminal of the AND circuit 34 is high, the output of the AND circuit 34 becomes high, as also is the output signal of the flip-flop circuit 35. As a result, the secondary scanning address generated by the secondary scanning address generating circuit 36 increases by a predetermined value for storage in the buffer memory 22.

On the other hand, when the signal from the adder 32 to the AND circuit 34 is low in the absence of a carry, the output signal from the AND circuit 34 becomes low, as also is the output signal from the flip-flop circuit 35. As a result, the secondary scanning address does not increase.

In this way, the secondary scanning address generating circuit 36 retains the same secondary scanning address until the adder 32 generates a high-level carry signal. Thus, as long as the secondary scanning address is retained, two or more lines of image data are successively overwritten at the same secondary scanning address. Such overwriting is equal to deletion of lines of image data in accordance with the reduction ratio selected by the user.

Of course, if the reduction ratio is unity (1), the adder 32 generates a high-level carry signal at the rise of every line-start signal. Thus, the secondary scanning address increases for every line of image data, so that no deletion of lines of image data takes place.

Each of the other two writing reduction circuits 21R, 21B performs a similar process with respect to a corresponding color set of image data for storing the reduced set of image data in the buffer memory 22. However, the first eight lines of blue image data and the first sixteen lines of red image data are treated as ineffective data not stored in the buffer memory 22, as previously described.

FIG. 6 is a table showing how a set of color image data is stored in the buffer memory 22 which may be a 4M-bit DRAM for storing 5,120-pixel data per line (i.e., in the primary scanning direction). The address of each pixel may be represented by a set of 19-bit data which includes lower nine bits for representing the primary scanning address and higher ten bits for representing the secondary scanning address. In the table of FIG. 6, the address of each pixel is represented by hexadecimal notation such as [3C000] (representing the address of the first pixel in the first line of the green image data), [3EB7FF] (representing the address of the last pixel in the second line of the green image data), and etc. For reasons of limited space, the table of FIG. 6 shows only the addresses of the first and last pixels in each line of pixels.

As appreciated from FIG. 6, the first pixel in every line of pixels has the same primary scanning address wherein all lower nine bits are equally zero (see [14000], [15400], [3C000] - - - ). Similarly, the last or any corresponding pixel in every line of pixels has the same primary scanning address (see [153FF], [167FF], [3D3FF] - - - ). Further, it is also understood from FIG. 6 that the first eight lines of blue image data and the first sixteen lines of red image data are treated as ineffective data not stored in the buffer memory 22.

At the time of reading out the color image data from the buffer memory 22, the reading reduction-enlargement circuit 23 generates primary and secondary scanning addresses which are used for supplying the color image data from the buffer memory 22 to the image sharpening circuit 24. At this time, the reading reduction-enlargement circuit 23 provides image enlargement in the secondary scanning direction and image reduction or enlargement in the primary scanning direction while reading out the color image data from the buffer memory 22 in sequence suitable for subsequent image sharpening in the image sharpening circuit 24.

The secondary scanning addresses used for reading out the color image data from the buffer memory 22 are generated by the secondary scanning address generating circuit 46 of the reading reduction-enlargement circuit 23. As previously described, the secondary scanning address is increased by a predetermined amount only when the adder 42 generates a high-level carry signal. Thus, in the absence of a high-level carry signal, the same line of color image data is read out repetitively plural times for enlarging the color image in the secondary scanning direction in accordance with the preset enlargement ratio. Of course, if the preset enlargement ratio is unity (1), the adder 42 generates a high-level carry signal for every line of image data, so that no repetitive reading of the same line of image data does not take place.

The primary scanning addresses used for reading out the color image data from the buffer memory 22 are generated by the primary scanning address generating circuit 56 of the reading reduction-enlargement circuit 23. Since the primary scanning address generating circuit 56 operates in synchronism with the divided clock signals from the frequency divider 57, the primary scanning address changes only once as the secondary address changes nine times if the reduction or enlargement ratio set for the primary scanning direction is unity (1).

Further, when the flag is high, the primary scanning address generating circuit 56 is held in the image enlargement state where the primary scanning address is retained for output to the buffer memory 22 until a high-level carry signal is transmitted from the adder 52. Conversely, when the flag is low, the primary scanning address generating circuit 56 is brought into the image reduction state wherein the primary scanning address is increased but not output to the buffer memory 22 in the absence of a high-level carry signal from the adder 52. In this way, the primary scanning address generating circuit 56 provides image enlargement in the primary scanning direction by repetitive reading of the same pixel data, or image reduction in the primary scanning direction by skipping of selected pixel data.

FIG. 7 shows an example of sequence in which the secondary scanning address generating circuit 46 (FIG. 4) and the primary scanning address generating circuit 56 (FIG. 5) read out the image data from the buffer memory 22. As shown, the image data is read out in the sequence of [0](red), [1400](red), [2800] (red), [14000](blue), [15400](blue), [16800] (blue), [3C000] (green), [3D400] (green), [3E800] (green), [1] (red), [1401](red), [2801] (red), [14001](blue), [15401] (blue), [16801] (blue), [3C001] (green), [3D401] (green), [3E801] (green), [2] (red), [1402] (red), [2802] (red), [14002] (blue), [15402] (blue), [16802] (blue), [3C002] (green), [3D402] (green) and [3E801] (green)

The increment of the secondary scanning address in each vertical column (e.g. [0], [1400], [2800], [14000], [15400], [16800], [3C000], [3D400], [3E800]) comes from the secondary scanning address generating circuit 46 provided by the three groups of shift registers. The red group of shift registers provides increments of [0]→[1400]→[2800], [1]→[1401]→[2801] and [2]→[1402]→[2802] in the secondary scanning address. The blue group of shift registers provides increments of [14000]→[15400]→[16800], [14001]→[15401]→[16801] and [14002]→[15402]→[16802] in the secondary scanning address. The green group of shift registers provides increments of [3C000]→[3D400]→[3E800], [3C001]→[3D401]→[3E801] and [3C002]→[3D402]→[3E802] in the secondary scanning address.

On the other hand, the primary scanning address remains unchanged while the second scanning address is increased. For instance, the nine data ([0], [1400], [2800], [14000], [15400], [16800], [3C000], [3D400], [3E800]) in the first vertical column in FIG. 7 have an equal primary scanning address of zero. This occurs due to the division of the clock signal frequency at the frequency divider 57. Therefore, the primary scanning address generating circuit 56 provides an increment of the primary scanning address only at an interval of nine clock signals which correspond to each divided clock signal.

The above-described sequence of reading out the image data from the buffer memory 22 is suitable for the filtering process at the image sharpening circuit 24 because a central pixel (e.g. [1401] can be conveniently compared with surrounding pixels (e.g. [0], [1400], [2800], [2801], [2802], [1402], [2] and [1]). Further, since the primary scanning address remains unchanged while the secondary scanning address is increased, it is possible to read out the image data at a high speed in high-speed page mode.

The RGB-color image data having been subjected to image sharpening at the image sharpening circuit 24 may be converted to CMY(Cyan, Magenta and Yellow)-color image data and further subjected to additional data processing (color control, γ-control for printout, error diffusion and etc.) before being transmitted to the RAM 3 under the control of the DMAC 9.

According to the embodiment described above, image reduction in the secondary scanning direction is provided by the three different writing reduction circuits 21R, 21G, 21B, whereas the reading reduction-enlargement circuit 23 provides image enlargement in the secondary scanning direction and image reduction or enlargement in the primary scanning direction. However, these functions may be provided by software addition utilizing the CPU 1. Further, in place of reducing the image data in the secondary scanning direction before storing in the buffer memory 22, the image data may be reduced in the primary scanning direction for storage in the buffer memory 22, in which case the image may be reduced or enlarged in the secondary scanning direction and enlarged in the primary scanning direction at the time of reading out the image data from the buffer memory 22. Moreover, in the case of processing non-color image data, the image process apparatus needs to incorporate only a single writing reduction circuit for reducing the image data in the primary or secondary scanning direction before storing in the buffer memory 22.

The present invention being thus described, it is obvious that the same may be varied in many ways. For instance, the image processing apparatus of the present invention may be incorporated in any apparatus, such as printer, image scanner or photocopying machine, which requires an image processing function. Such variations should not be regarded as a departure from the spirit and scope of the present invention, and all such modifications as would be obvious to those skilled in the art are intended to be included within the scope of the following claims.

What is claimed is:

1. An apparatus for processing an image comprising:

a line buffer memory for storing a set of image data which includes plural groups of image data, each group of image data being obtained from a line of pixels arranged in a primary scanning direction which is perpendicular to a secondary scanning direction;

an analog-to-digital converter for converting analog image signals to digital image data for supply to the line buffer memory;

a writing reducer arranged between the analog-to-digital converter and the line buffer memory for reducing the image in the secondary scanning direction only by deleting selected groups of image data before storing the set of image data in the line buffer memory; and a reading reducer-enlarger for enlarging the image in the secondary scanning direction and for reducing or enlarging the image in the primary scanning direction at the time of reading out the stored set of image data from the line buffer memory.

2. The image processing apparatus according to claim 1, wherein the writing reducer comprises a writing reduction circuit, the reading reducer-enlarger comprising a reading reduction-enlargement circuit.

3. The image processing apparatus according to claim 2, wherein the writing reduction circuit is supplied with line-start signals and clock signals of a predetermined frequency, the writing reduction circuit comprising:

a setting register for presetting a reduction ratio;

a secondary scanning address generating circuit for generating a secondary scanning address which increases by a predetermined amount in synchronism with the clock signals upon input of a number of line-start signals determined according to the preset reduction ratio; and a primary scanning address generating circuit for generating a primary scanning address which increases one by one in synchronism with the clock signals.

4. The image processing apparatus according to claim 3, wherein the secondary scanning address generated by the secondary scanning address generating circuit starts increasing from a first initial value and returns to the first initial value when a predetermined number of groups of image data are processed, the primary scanning address generated by the primary scanning address generating circuit starting to increase from a second initial value and returning to the second initial value when all image data in each group of image data are processed.

5. The image processing apparatus according to claim 2, wherein the reading reduction-enlargement circuit comprises a secondary direction enlargement circuit portion for enlarging the image in the secondary scanning direction by repetitively reading out each group of image data from the memory.

6. The image processing apparatus according to claim 5, wherein the secondary direction enlargement circuit portion of the reading reduction-enlargement circuit is supplied with line-start signals and clock signals of a predetermined frequency, the secondary direction enlargement circuit portion comprising:

a setting register for presetting an enlargement ratio; and a secondary scanning address generating circuit for generating a secondary scanning address which increases by a predetermined amount in synchronism with the clock signals upon input of a number of line-start signals determined according to the preset enlargement ratio.

7. The image processing apparatus according to claim 2, wherein the reading reduction-enlargement circuit comprises a primary direction reduction-enlargement circuit portion for reducing the image in the primary scanning direction by skipping selected pixel image data in each group of image data at the time of reading out the stored set of image data from the memory and for enlarging the image by repetitively reading out each pixel image data in each group of image data from the memory.

8. The image processing apparatus according to claim 7, wherein the primary direction reduction-enlargement circuit portion of the reading reduction-enlargement circuit comprises:

a setting register for presetting a reduction or enlargement ratio; and a primary scanning address generating circuit for generating a primary scanning address used for reading out the stored set of image data from the memory, the primary scanning address generating circuit being supplied with a flag, the primary scanning address generating circuit enlarging the image in the primary scanning direction by repetitively reading out each pixel image data in each group of image data from the memory in accordance with the preset enlargement ratio when the flag is in a first state, the primary scanning address generating circuit reducing the image in the primary scanning direction by skipping selected pixel image data in each group of image data in accordance with the preset reduction ratio at the time of reading out the stored set of image data from the memory when the flag is in a second state.

9. The image processing apparatus according to claim 8, wherein the primary direction reduction-enlargement circuit portion of the reading reduction-enlargement circuit is supplied with clock signals of a predetermined frequency, the primary direction reduction-enlargement circuit portion further comprising a frequency divider for dividing the frequency of the clock signals, the primary scanning address generating circuit reading out the stored set of image data from the memory in synchronism with the divided clock signals.

10. An apparatus for processing a color image comprising:

a line buffer memory for storing different color sets of image data, each set of image data including plural groups of image data, each group of image data being obtained from a line of pixels arranged in a primary scanning direction which is perpendicular to a secondary scanning direction;

an analog-to-digital converter for converting analog image signals to image data for supply to the line buffer memory;

a writing reducer arranged between the analog-to-digital converter and the line buffer memory for reducing the color image in the secondary scanning direction only by deleting selected groups of image data in each set of image data before storage in the line buffer memory; and a reading reducer-enlarger for enlarging the color image in the secondary scanning direction and for reducing or enlarging the color image in the primary scanning direction at the time of reading out the stored sets of image data from the line buffer memory.

11. The image processing apparatus according to claim 10, wherein the writing reducer comprises a plurality of writing reduction circuits each for a different color set of image data, the reading reducer-enlarger comprising a single reading reduction-enlargement circuit common for the different color sets of image data.

12. The image processing apparatus according to claim 11, wherein each of the writing reduction circuits is supplied with line-start signals and clock signals of a predetermined frequency, the writing reduction circuit comprising:

a setting register for presetting a reduction ratio;

a secondary scanning address generating circuit for generating a secondary scanning address which increases by a predetermined amount in synchronism with the clock signals upon input of a number of line-start signals determined according to the preset reduction ratio; and a primary scanning address generating circuit for generating a primary scanning address which increases one by one in synchronism with the clock signals.

13. The image processing apparatus according to claim 12, wherein the secondary scanning address generated by the secondary scanning address generating circuit starts increasing from a first initial value and returns to the first initial value when a predetermined number of groups of image data are processed, the primary scanning address generated by the primary scanning address generating circuit starting to increase from a second initial value and returning to the second initial value when all image data in each group of image data are processed.

14. The image processing apparatus according to claim 11, wherein the reading reduction-enlargement circuit comprises a secondary direction enlargement circuit portion for enlarging the color image in the secondary scanning direction by repetitively reading out each group of image data from the memory.

15. The image processing apparatus according to claim 14, wherein the secondary direction enlargement circuit portion of the reading reduction-enlargement circuit is supplied with line-start signals and clock signals of a predetermined frequency, the secondary direction enlargement circuit portion comprising:

a setting register for presetting an enlargement ratio; and a secondary scanning address generating circuit for generating a secondary scanning address which increases by a predetermined amount in synchronism with the clock signals upon input of a number of line-start signals determined according to the preset enlargement ratio.

16. The image processing apparatus according to claim 11, wherein the reading reduction-enlargement circuit comprises a primary direction reduction-enlargement circuit portion for reducing the color image in the primary scanning direction by skipping selected pixel image data in each group of image data at the time of reading out the stored sets of image data from the memory and for enlarging the image by repetitively reading out each pixel image data in each group of image data from the memory.

17. The image processing apparatus according to claim 16, wherein the primary direction reduction-enlargement circuit portion of the reading reduction-enlargement circuit comprises:

a setting register for presetting a reduction or enlargement ratio; and a primary scanning address generating circuit for generating a primary scanning address used for reading out the stored sets of image data from the memory, the primary scanning address generating circuit being supplied with a flag, the primary scanning address generating circuit enlarging the color image in the primary scanning direction by repetitively reading out each pixel image data in each group of image data from the memory in accordance with the preset enlargement ratio when the flag is in a first state, the primary scanning address generating circuit reducing the color image in the primary scanning direction by skipping selected pixel image data in each group of image data in accordance with the preset reduction ratio at the time of reading out the stored sets of image data from the memory when the flag is in a second state.

18. The image processing apparatus according to claim 17, wherein the primary direction reduction-enlargement circuit portion of the reading reduction-enlargement circuit is supplied with clock signals of a predetermined frequency, the primary direction reduction-enlargement circuit portion further comprising a frequency divider for dividing the frequency of the clock signals, the primary scanning address generating circuit reading out the stored sets of image data from the memory in synchronism with the divided clock signals.

19. The image processing apparatus according to claim 1, wherein the writing reducer comprises a plurality of writing reduction circuits for plural sets of image data, the reading reducer-enlarger comprising a common reading reduction-enlargement circuit for the plural sets of image data.

20. The image processing apparatus according to claim 19, wherein the plural sets of image data are different color sets of image data.

21. An apparatus for processing an image comprising:

a memory for storing a set of image data which includes plural groups of image data, each group of image data being obtained from a line of pixels arranged in a primary scanning direction which is perpendicular to a secondary scanning direction;

an analog-to-digital converter for converting analog image signals to digital image data for supply to the memory;

at writing reducer arranged between the analog-to-digital converter and the memory for reducing the image in the secondary scanning direction only by deleting selected groups of image data before storing the set of image data in the memory, the writing reducer being not preceded by any memory or buffer; and a reading reducer-enlarger for enlarging the image in the secondary scanning direction and for reducing or enlarging the image in the primary scanning direction at the time of reading out the stored set of image data from the memory.

* * * * *